(12) United States Patent
Jiang

(10) Patent No.: US 11,759,904 B2
(45) Date of Patent: Sep. 19, 2023

(54) FEEDING DEVICE

(71) Applicant: TRIPLE WIN TECHNOLOGY(SHENZHEN) CO.LTD., Shenzhen (CN)

(72) Inventor: Ming-Yang Jiang, Shenzhen (CN)

(73) Assignee: TRIPLE WIN TECHNOLOGY(SHENZHEN) CO.LTD., Shenzhen (CN)

(*) Notice: Subject to any disclaimer, the term of this patent is extended or adjusted under 35 U.S.C. 154(b) by 365 days.

(21) Appl. No.: 17/322,232

(22) Filed: May 17, 2021

(65) Prior Publication Data

US 2021/0370454 A1  Dec. 2, 2021

(30) Foreign Application Priority Data

May 29, 2020 (CN) .......................... 202010479430.1

(51) Int. Cl.
*B23Q 5/34* (2006.01)

(52) U.S. Cl.
CPC ..................................... *B23Q 5/34* (2013.01)

(58) Field of Classification Search
CPC ........... Y02P 70/50; B65G 47/06; B25H 3/04; B23Q 5/34; B23Q 7/103
USPC ...................................................... 198/750.1
See application file for complete search history.

(56) References Cited

U.S. PATENT DOCUMENTS

| 7,410,227 | B2* | 8/2008 | Liao | E05B 65/463 |
| | | | | 312/221 |
| 8,820,512 | B2* | 9/2014 | Sugiura | B65G 17/32 |
| | | | | 198/803.14 |
| 2005/0210933 | A1* | 9/2005 | Wen | E05B 65/463 |
| | | | | 70/85 |

FOREIGN PATENT DOCUMENTS

| CN | 206723253 U | 12/2017 |
| CN | 208992685 U | 6/2019 |
| CN | 209440133 U | 9/2019 |
| WO | WO-2019047321 A1 * | 3/2019 |

OTHER PUBLICATIONS

Espacenet machine translation of CN206723253U; https://translationportal.epo.org/emtp/translate/?ACTION=description-retrieval&COUNTRY=CN&ENGINE=google&FORMAT=docdb&KIND=U&LOCALE=en_EP&NUMBER=206723253&OPS=ops.epo.org/3.2&SRCLANG=zh&TRGLANG=en (Year: 2017).*

Espacenet machine translation of CN209440133U; https://translationportal.epo.org/emtp/translate/?ACTION=description-retrieval&COUNTRY=CN&ENGINE=google&FORMAT=docdb&KIND=U&LOCALE=en_EP&NUMBER=209440133&OPS=ops.epo.org/3.2&SRCLANG=zh&TRGLANG=en (Year: 2019).*

* cited by examiner

*Primary Examiner* — Leslie A Nicholson, III
(74) *Attorney, Agent, or Firm* — ScienBiziP, P.C.

(57) ABSTRACT

A feeding device includes a material rack configured to support a carrier board, a ratchet mechanism disposed outside the material rack, a locking mechanism disposed outside the material rack, and a triggering mechanism. The locking mechanism can engage with the ratchet mechanism. The triggering mechanism an drive the ratchet mechanism to move back and forth in a first direction, thereby controlling the locking mechanism to move back and forth in a second direction different from the first direction, so that the material rack alternates between a locked state and an unlocked state.

11 Claims, 6 Drawing Sheets

FEEDING DEVICE

FIELD

The subject matter herein generally relates to a feeding device.

BACKGROUND

During production, materials need to be loaded to a desired workstation through a clip-typed feeding device. However, locking and unlocking of the feeding device are performed manually. If an operator forgets to lock the feeding device, the material may fall out of the feeding device, causing damages to the material. If an operator forgets to unlock the feeding device, the feeding device may tilt, resulting the material become flipped.

BRIEF DESCRIPTION OF THE DRAWINGS

Implementations of the present technology will now be described, by way of embodiment, with reference to the attached figures.

DETAILED DESCRIPTION

Figure 1:
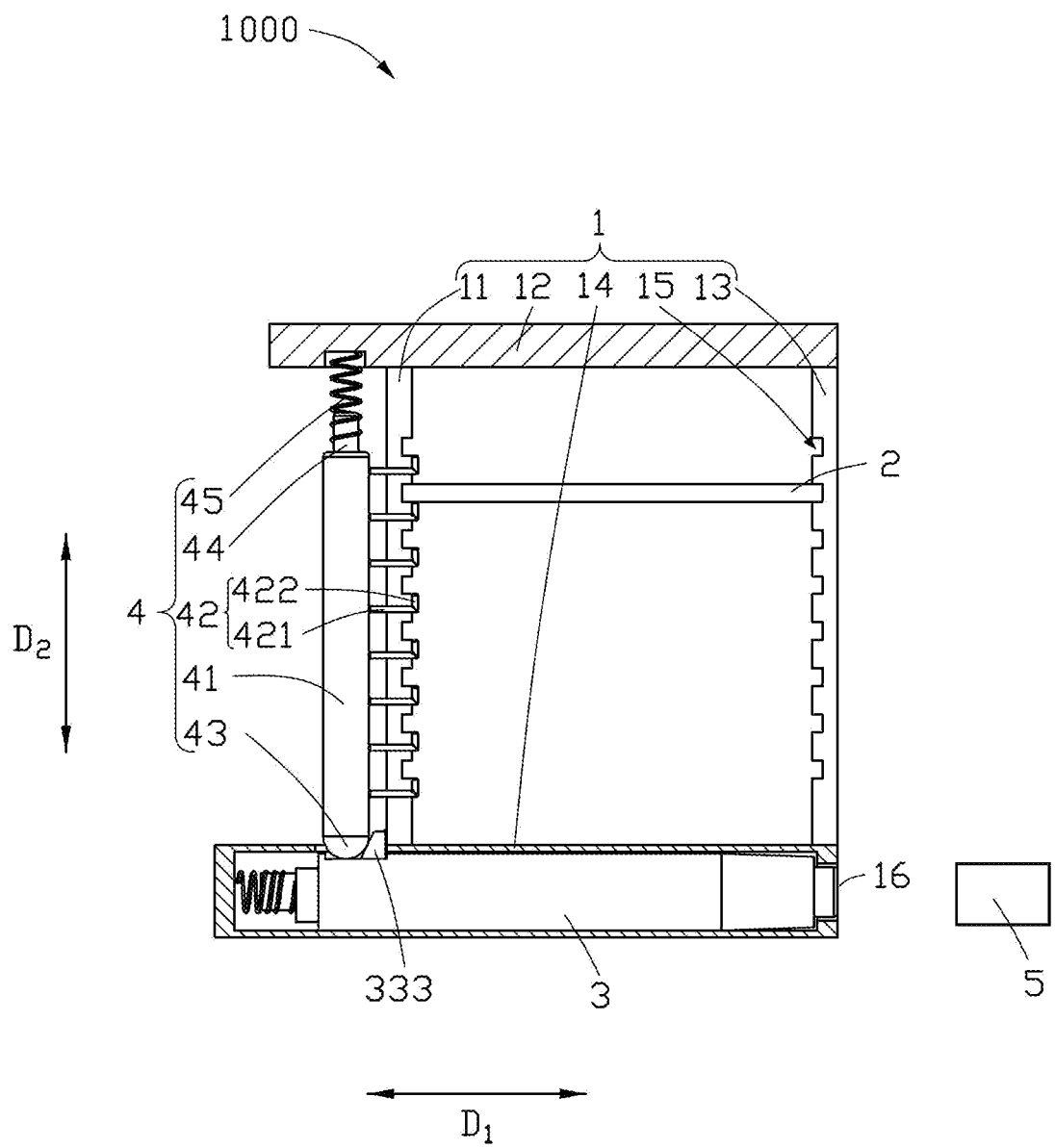
FIG. 1 is a diagrammatic view of an embodiment of a feeding device according to the present disclosure, in an unlock state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIGS. 1 to 4 illustrate an embodiment of a feeding device 1000. The device 1000 includes a material rack 1, at least one carrier board 2, a ratchet mechanism 3, and a triggering mechanism 5. The carrier board 2 is removably disposed inside the material rack 1. The ratchet mechanism 3 and the locking mechanism 4 are disposed outside the material rack 1, and can be engaged with each other. The triggering mechanism 5 can drive the ratchet mechanism 3 to move back and forth in a first direction D1, thereby controlling the locking mechanism 4 to move back and forth in a second direction D2 different from the first direction D1, so that the material rack 1 alternates between a locked state and an unlocked state. When the material rack 1 is in the locked state, the carrier board 2 can be prevented from separated from the material rack 1. Specifically, the first direction D1 is an extending direction of the ratchet mechanism 3, and the second direction D2 is an extending direction of the locking mechanism 4.

Referring to FIG. 1, the material rack 1 includes a first side plate 11, a second side plate 13, a top plate 12, and a bottom plate 14. The first side plate 11 and the second side plate 13 face each other. The first side plate 11 and the second side plate 13 face each other. Each of the first side plate 11 and the second side plate 13 defines a slot 15. The slot 15 on the first side plate 11 and the slot 15 on the second side plate 13 correspond to each other. The carrier board 2 is disposed in the two corresponding slots 15.

The ratchet mechanism 3 is disposed under the bottom plate 14. In other embodiments, the ratchet mechanism 3 may also be disposed above the top plate 12. The locking mechanism 4 is disposed on the first side plate 11 or the second side plate 13.

Figure 2:
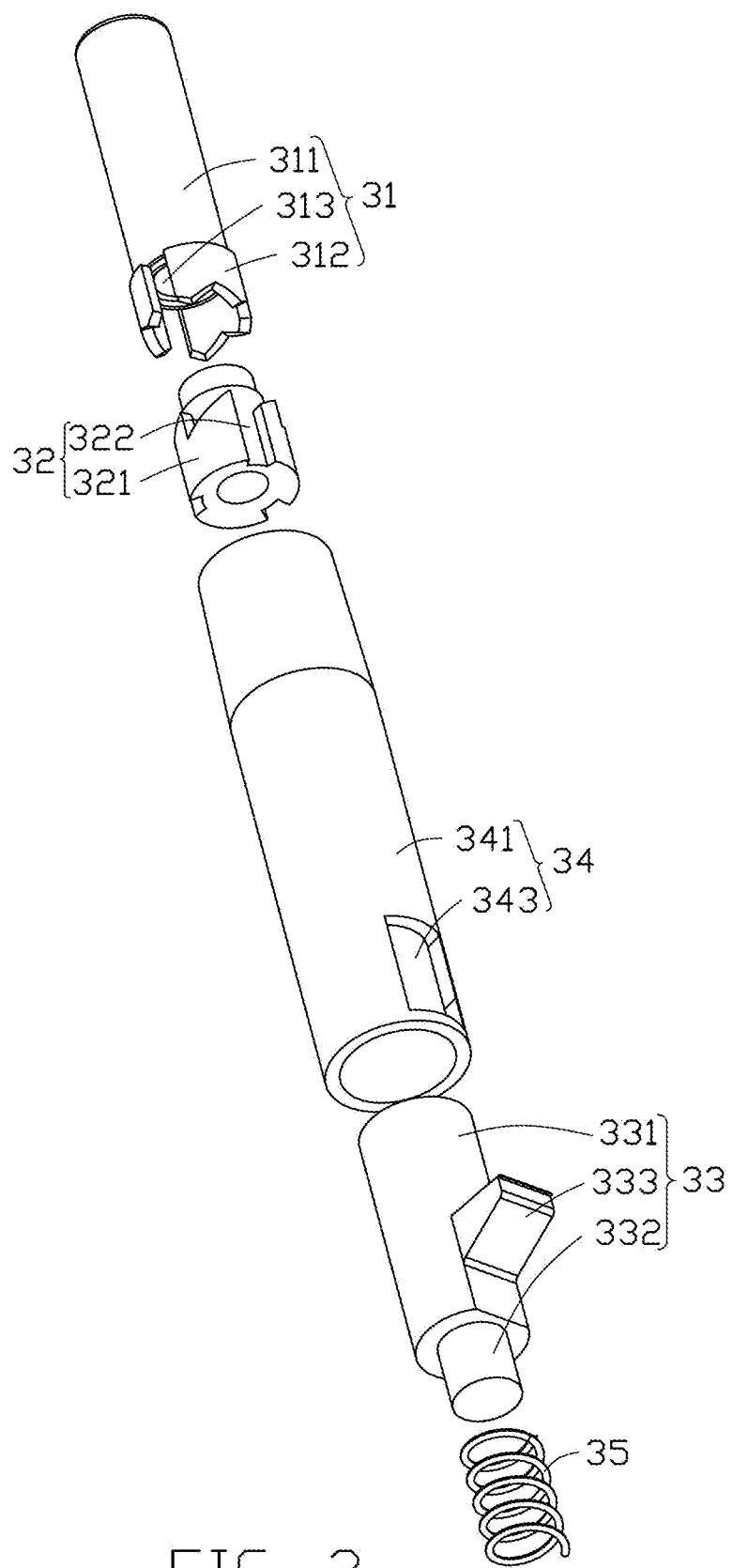
FIG. 2 is an exploded view of a ratchet mechanism of the feeding device of FIG. 1.
Figure 3:
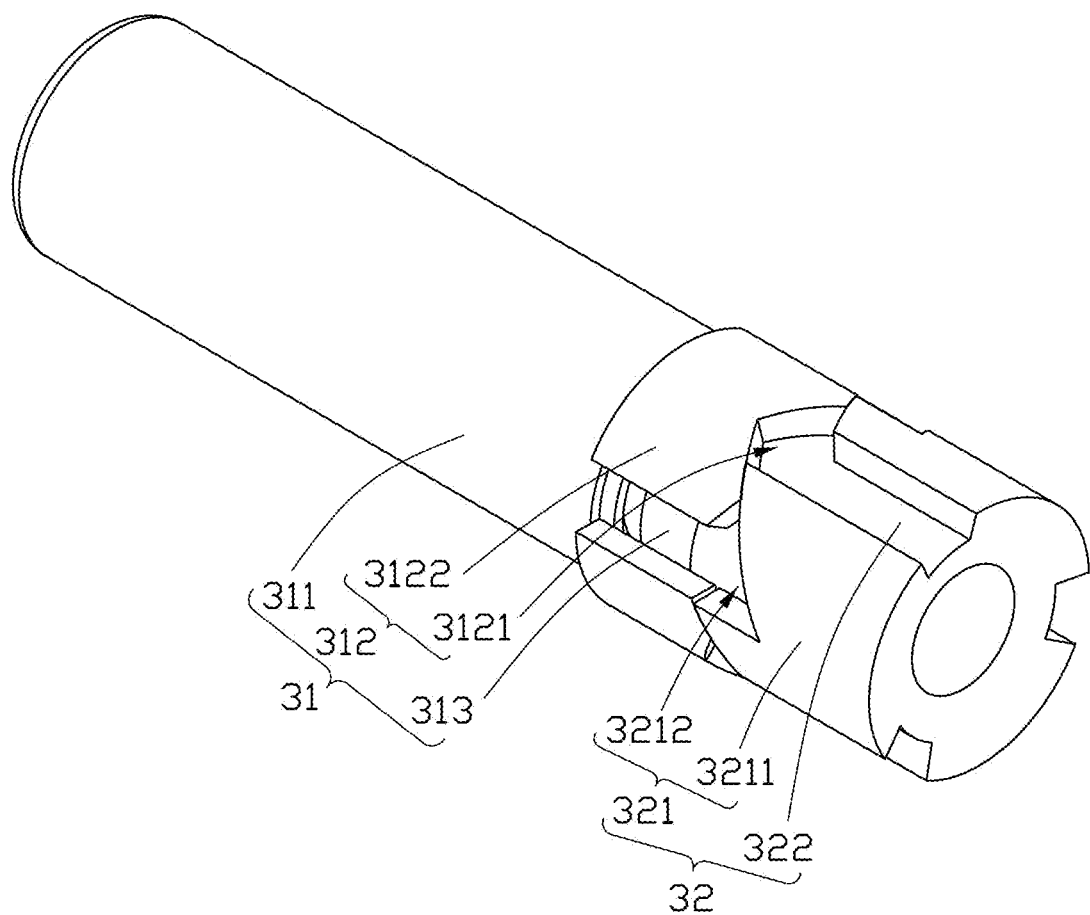
FIG. 3 is diagrammatic view of a push rod ratchet and a rotation ratchet of the ratchet mechanism of FIG. 2.

Referring to FIGS. 2 and 3, the ratchet mechanism 3 includes a push rod ratchet 31, a rotation ratchet 32, a push rod 33, a shell 34, and a first elastic member 35. An end of the rotation ratchet 32 is engaged with the push rod ratchet 31. The push rod 33 is disposed at another end of the rotation ratchet 32 away from the push rod ratchet 31. The first elastic member 35 is disposed at one end of the push rod 33 away from the rotation ratchet 32. The shell 34 is sleeved on the push rod ratchet 31, the rotation ratchet 32, and the push rod 33. When an end of the push rod ratchet 31 away from the rotation ratchet 32 is pressed, the push rod ratchet 31 and the rotation ratchet 32 can cooperatively push the push rod 33 to move in the first direction D1.

The push rod ratchet 31 includes a push rod ratchet body 311, a plurality of ratchet teeth 312, and a first track groove 313. The ratchet teeth 312 are disposed at an end of the push rod ratchet body 311 facing the rotation ratchet 32. The first track groove 313 is disposed between two adjacent ratchet teeth 312. Each of the ratchet teeth 312 includes two tooth portions 3122 and a first groove portion 3121 between the two tooth portions 3122.

The rotation ratchet 32 includes a plurality of ratchet pawls 321 and a second track groove 322. The second track groove 322 is disposed between two adjacent ratchet pawls 321. Each of the ratchet pawls 321 includes two pawl portions 3211 and a second groove portion 3212 disposed between the two pawl portions 3211.

Figure 4:
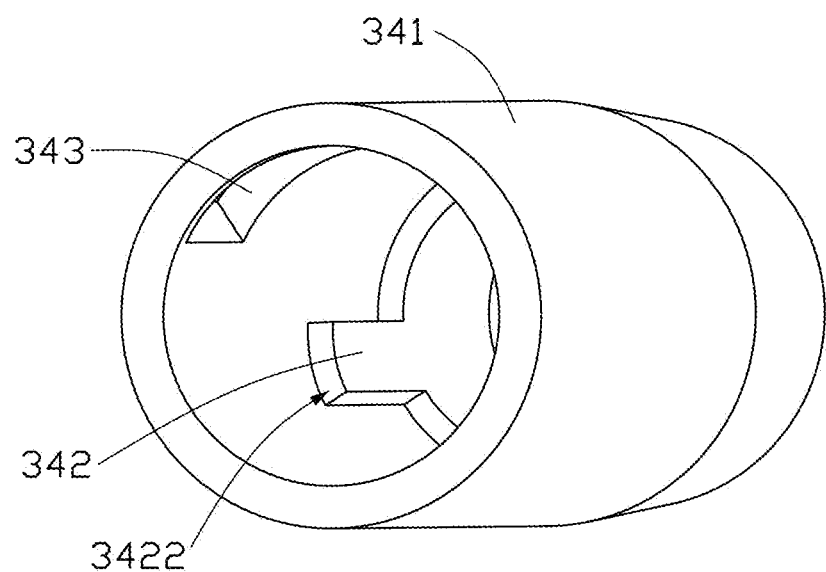
FIG. 4 is diagrammatic view of a shell of the ratchet mechanism of FIG. 3.

Referring to FIGS. 2 and 4, the shell 34 includes a shell body 341, a guiding block 342, and a limiting opening 343. The guiding block 342 is disposed on an inner surface of the sidewall of the shell body 341. The limiting opening 343 is disposed at an end of the shell body 341 adjacent to the push rod 33, and penetrates the sidewall of the shell body 314. The rotation ratchet 32 includes a tip portion 3422 facing the push rod 33.

The push rod 33 includes a push rod body 331, a positioning post 332, and a top block 333. The positioning post 332 is disposed at an end of the push rod body 331 away from the rotation ratchet 32. The top block 333 is wedge-shaped and disposed on a sidewall of push rod body 331. The top block 333 partially protrudes from the limiting opening 343, and can move in the limiting opening 343 in the first direction D1. The first elastic member 35 is sleeved on the positioning post 332.

The rotation ratchet 32 can rotate in a single direction, specifically, the rotation ratchet 32 can rotate about the first direction D1 in a single direction. The push rod ratchet 31 and the rotation ratchet 32 can be engaged with each other through the ratchet teeth 312 and the ratchet pawl 321. When the rotation ratchet 32 rotates, the first track groove 313 can communicate with the second track groove 322, and the guiding block 342 can slide along the first track groove 313 and the second track groove 322.

The ratchet mechanism 3 can operate as follows.

S1: a front end of the push rod ratchet body 311 (the front end means the end of the push rod ratchet body 311 away from the ratchet teeth 312, thus, the other end of the push rod ratchet body 311 is a rear end) is pushed, thus the push rod ratchet 31 can move backward in the first direction D1. When the tooth portions 3122 of the ratchet tooth 312 abut against the ratchet pawls 321, the push rod ratchet 31 and the rotation ratchet 32 together move backward until the rotation ratchet 32 reaches the tip portion 3422 of the guiding block 343. Then, the rotation ratchet 32 can push the push rod 33 to move backward and compress the first elastic member 35.

S2: The elastic member 35 rebounds to drive the rotation ratchet 32, through the push rod 33, to rotate in a single direction, to cause the tip portion 3422 to be disposed in the second groove portion 3212 of the ratchet pawls 321. An interaction force is generated between the limiting block 344 and the second groove portion 3212. When the rotation ratchet 32 continue to move, the rotation ratchet 32 passes the tip portion 3422 and continues to rotate in the single direction, until the ratchet pawls 321 of the rotation ratchet 32 are blocked by the guiding block 342. At this time, the top block 333 of the push rod 33 is disposed at the front end of the limiting opening 343. The locking mechanism 4 drops to unlock the material rack 1.

S3: the push rod ratchet 31 returns to its original position under the function of the first elastic member 35, to ready for a next pressing.

S4: the front end of the push rod ratchet 31 is pressed again. The rotation ratchet 32 continues to rotate in the single direction when pushed by the first elastic member 35, so that the first track groove 313 communicates with the second track groove 322. The sliding distance of the guiding block 342 increases (the guiding block 342 can slide in the second track groove 322 and the first track groove 313). When the tip portion 3422 of the guiding block 342 abuts against the bottom end of the second track groove 322, the push rod 33 drives the top block 333 to move backward to the rear end of the limiting opening 343, thereby lifting up the locking mechanism 4 to lock the slot 15.

S5: the push rod ratchet 31 returns to its original position to ready for a next pressing.

Referring to FIG. 1, the locking mechanism 4 includes a lifting rod 41, a plurality of locking members 42, a second elastic member 45, and a rotation ball 43. The locking members 42 are disposed on a sidewall of the lifting rod 41. The second elastic member 45 is disposed at an end of the lifting rod 41 away from the ratchet mechanism 3. The rotation ball 43 is disposed at the other end of the lifting rod 41. In at least one embodiment, the lifting rod 41 includes a top portion 44 with a smaller width. The second elastic member 45 is sleeved on the top portion 44. The rotation ball 43 is partially embedded in the bottom of the lifting rod 41. The rotation ball 43 facilitates the interaction between the lifting rod 41 and the top block 333.

Each of the locking members 42 includes a connection portion 421 and a locking portion 422. The connection portion 421 is between the locking portion 422 and the lifting rod 41. The connection portion 421 and the locking portion 422 cooperatively form an L-shaped structure. In at least one embodiment, the locking portion 422 can abut against one of two vertical openings of the slot 15 to prevent the carrier board 2 from separating from the slot 15. That is, the material rack 1 is switched to the locked state. When the locking members 42 drops to leave the vertical opening of the slot 15 (the locking portion 422 can be disposed between two adjacent slots 15), the material rack 1 is switched to the unlocked state.

Figure 5:
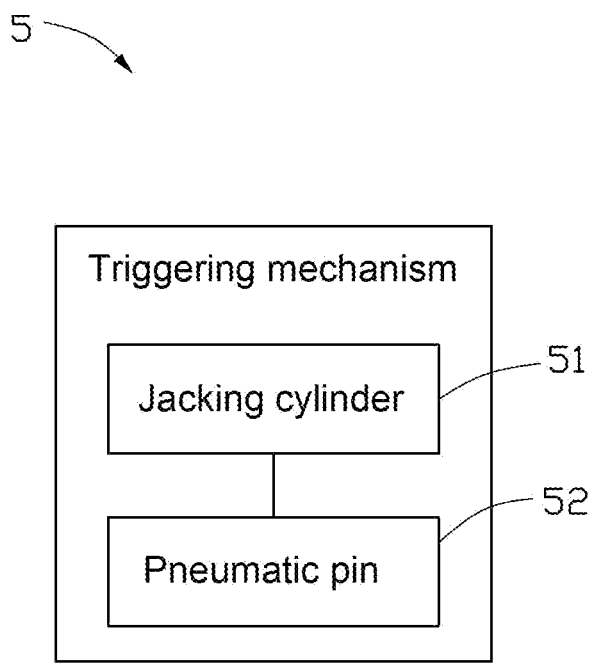
FIG. 5 is a block diagram of a triggering mechanism of the feeding device of FIG. 1.

In at least one embodiment, the device 1000 can further include a triggering system (not shown). The triggering system includes a sensor, a controller, and the triggering mechanism 5. The sensor and the triggering mechanism 5 are both electrically connected to the controller. The sensor can be set in the slot 15. The sensor can sense whether the material rack 1 is switched to the locked or the unlocked state and generate a corresponding sensing signal. The controller controls the triggering mechanism 5 to operate, thereby driving the ratchet mechanism 3 to move in the first direction D1 based on the sensing signal, so as to lift up or drop the locking mechanism 4. Referring to FIG. 5, in at least one embodiment, the triggering mechanism 5 includes a jacking cylinder 51 and a pneumatic pin 52 connected to the jacking cylinder 51. The jacking cylinder 51 can drive the pneumatic pin 52 to push the ratchet mechanism 3 to move in the first direction. In at least one embodiment, the bottom of the material rack 1 defines a pin hole 16. The pneumatic pin 52 can push the push rod ratchet 31 of the ratchet mechanism 3 through the pin hole 16.

During use, when the sensor sense that the material rack 1 is switched to the locked state, the jacking cylinder 51 can drive the pneumatic pin 52 to press the ratchet mechanism 3 to move in the first direction D1. Then, the locking mechanism 4 drops down to unlock the material rack 1. When the material rack 1 is switched to the unlocked state, the carrier board 2 can be loaded into the material rack 1. The jacking cylinder 51 drives the pneumatic pin 52 to press the ratchet mechanism 3 to move along the first direction D1. Then, the locking mechanism 4 lifts up to lock the material rack 1.

Figure 6:
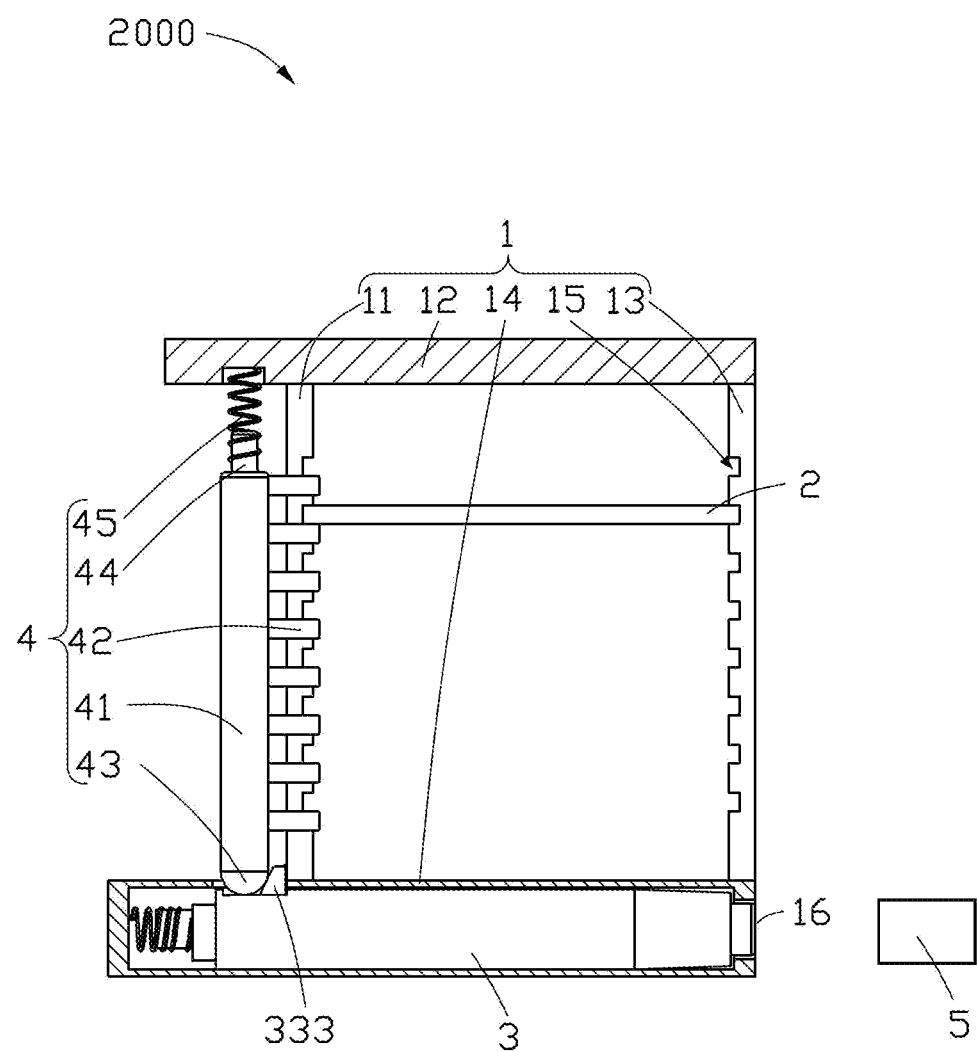
FIG. 6 is a diagrammatic view of another embodiment of a feeding device according to the present disclosure.

Referring to FIG. 6, another embodiment of a feeding device 2000 is also provided. Different from the device 1000, the locking member 42 is sheet-shaped. That is, the locking member 42 may only include the connection portion 421. The width of the locking member 42 is greater than or equal to the width of the slot 15, but less than or equal to the width between two adjacent slots 15. As such, the locking member 42 can also abut against the vertical opening of the slot 15 to lock the material rack 1. Furthermore, when the material rack 1 is switched to the unlocked state, the locking member 42 will not affect the loading of the carrier board 2 into the material rack 1.

With the above configuration, the material rack 1 can be automatically switched to the locked or unlocked state. Locking the material rack 1 can prevent the carrier board 2 from falling out of the material rack 1.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A feeding device comprising:
a material rack configured to support a carrier board;
a ratchet mechanism disposed outside the material rack;
a locking mechanism disposed outside the material rack and configured to engage with the ratchet mechanism; and
a triggering mechanism configured to drive the ratchet mechanism to move back and forth in a first direction, thereby controlling the locking mechanism to move back and forth in a second direction different from the first direction, so that the material rack alternates between a locked state and an unlocked state.

2. The feeding device of claim 1, wherein the material rack comprises a first side plate, a second side plate, a bottom plate, and a top plate; the first side plate faces the second side plate, the bottom plate faces the top plate, the ratchet mechanism is disposed under the bottom plate, the locking mechanism is disposed on the first side plate or the second side plate.

3. The feeding device of claim 2, wherein each of the first side plate and the second side plate defines a slot, the slot on the first side plate and the slot on the second side plate correspond to each other, each of the slot is configured to receive the carrier board therein.

4. The feeding device of claim 1, wherein the ratchet mechanism comprises a push rod ratchet, a rotation ratchet, a push rod, a shell, and a first elastic member, an end of the rotation ratchet is engaged with the push rod ratchet, the push rod is disposed at another end of the rotation ratchet away from the push rod ratchet, the first elastic member is disposed at one end of the push rod away from the rotation ratchet, the shell is sleeved on the push rod ratchet, the rotation ratchet, and the push rod;
wherein when an end of the push rod ratchet away from the rotation ratchet is pressed, the push rod ratchet and the rotation ratchet are configured to cooperatively push the push rod to move in the first direction.

5. The feeding device of claim 4, wherein the locking mechanism comprises a lifting rod, a locking member, a second elastic member, and a rotation ball, the locking member is disposed on a sidewall of the lifting rod, the second elastic member is disposed at an end of the lifting rod away from the ratchet mechanism, the rotation ball is partially embedded in another end of the lifting rod.

6. The feeding device of claim 4, wherein the push rod ratchet comprises a push rod ratchet body, a plurality of ratchet teeth, and a first track groove, the plurality of ratchet teeth is disposed at an end of the push rod ratchet body facing the rotation ratchet, the first track groove is disposed between two adjacent ones of the plurality of ratchet teeth;
the rotation ratchet comprises a plurality of ratchet pawls and a second track groove, the second track groove is disposed between two adjacent of the plurality of ratchet pawls, the plurality of ratchet teeth and the plurality of ratchet pawls are configured to engage with each other, the rotation ratchet is configured to rotate around the first direction in a single direction when the push rod ratchet moves in the first direction, causing the first track groove to communicate with the second track groove.

7. The feeding device of claim 6, wherein the shell comprises a shell body, a guiding block, and a limiting opening, the guiding block is on an inner surface of the sidewall of the shell body, the limiting opening is disposed at an end of the shell body adjacent to the push rod, and penetrates the sidewall of the shell body;
the push rod comprises a push rod body, a positioning post, and a top block, the positioning post is disposed at an end of the push rod body away from the rotation ratchet, the top block is wedge-shaped and disposed on a sidewall of push rod body, the top block partially protrudes from the limiting opening, and is configured to move in the limiting opening in the first direction, the first elastic member is sleeved on the positioning post;
the guiding block is configured to move in the first track groove and the second track groove, respectively.

8. The feeding device of claim 5, wherein the lifting rod comprises a top portion, the second elastic member is sleeved on the top portion.

9. The feeding device of claim 5, wherein the locking member comprises a connection portion and a locking portion, the connection portion is between the locking portion and the lifting rod, the connection portion and the locking portion cooperatively form an L-shaped structure, the locking portion is configured to abut against one vertical opening of the slot.

10. The feeding device of claim 5, wherein the locking member comprises a connection portion, the connection portion is configured to abut against one vertical opening of the slot.

11. The feeding device of claim 1, wherein the triggering mechanism comprises a jacking cylinder and a pneumatic pin connected to the jacking cylinder, the jacking cylinder is configured to drive the pneumatic pin to press ratchet mechanism.

* * * * *